(12) United States Patent
Okada et al.

(10) Patent No.: US 7,771,124 B2
(45) Date of Patent: Aug. 10, 2010

(54) BEARING APPARATUS FOR A WHEEL OF VEHICLE

(75) Inventors: Koichi Okada, Iwata (JP); Yutaka Hayashi, Iwata (JP); Kenichi Iwamoto, Iwata (JP); Takashi Koike, Iwata (JP)

(73) Assignee: NTN Corporation (JP)

( * ) Notice: Subject to any disclaimer, the term of this patent is extended or adjusted under 35 U.S.C. 154(b) by 1282 days.

(21) Appl. No.: 10/559,271

(22) PCT Filed: Jun. 1, 2004

(86) PCT No.: PCT/JP2004/007504

§ 371 (c)(1),
(2), (4) Date: Dec. 2, 2005

(87) PCT Pub. No.: WO2004/109133

PCT Pub. Date: Dec. 16, 2004

(65) Prior Publication Data

US 2006/0133706 A1    Jun. 22, 2006

(30) Foreign Application Priority Data

Jun. 3, 2003   (JP) ............................. 2003-157558
Mar. 15, 2004  (JP) ............................. 2004-072222

(51) Int. Cl.
*F16C 25/08* (2006.01)
*F16C 41/00* (2006.01)

(52) U.S. Cl. ..................... 384/517; 384/448; 384/544

(58) Field of Classification Search .............. 384/448, 384/517, 544
See application file for complete search history.

(56) References Cited

U.S. PATENT DOCUMENTS

| 4,676,667 | A |   | 6/1987  | Komatsu |
|-----------|---|---|---------|---------|
| 5,067,827 | A |   | 11/1991 | Bokel   |
| 5,564,840 | A | * | 10/1996 | Jurras et al. ................. 384/517 |
| 6,422,757 | B1| * | 7/2002  | Wu et al. ..................... 384/517 |
| 6,508,592 | B1| * | 1/2003  | Perni et al. .................. 384/517 |

FOREIGN PATENT DOCUMENTS

DE      100 60 638      8/2001

(Continued)

*Primary Examiner*—William C Joyce
(74) *Attorney, Agent, or Firm*—Harness, Dickey & Pierce, P.L.C.

(57) ABSTRACT

A vehicle wheel bearing apparatus has a wheel hub integrally formed with a peripheral wheel mounting flange at one end and a double row rolling bearing. The double row rolling bearing has an outer member integrally formed with a peripheral body mounting flange and with double row outer raceway surfaces. An inner member, including the wheel hub, is formed with double row inner raceway surfaces each arranged opposite to each of the double row outer surfaces. Double row rolling elements are freely rotatably contained between the double row outer and inner raceway surfaces. The double row rolling bearing is adapted to receive a predetermined preload. A separate outer or inner ring is arranged on at least one of the outer or inner members. A preload varying mechanism is arranged at an abutting portion between the outer and inner members to vary the preload applied to the bearing. The preload varying mechanism can be extended or contracted based on an output signal from a detecting sensor to detect the vehicle running conditions.

7 Claims, 11 Drawing Sheets

FOREIGN PATENT DOCUMENTS

| | | |
|---|---|---|
| GB | 1 535 163 | 12/1978 |
| JP | 64-087916 | 4/1989 |
| JP | 03-121308 | 5/1991 |
| JP | 03-265711 | 11/1991 |
| JP | 05-026235 | 2/1993 |
| JP | 05-079514 | 3/1993 |
| JP | 05-288217 | 11/1993 |
| JP | 06-341431 | 12/1994 |
| JP | 11-223216 | 8/1999 |
| JP | 2002-339964 | * 11/2002 |

* cited by examiner

PRIOR ART

PRIOR ART

Fig. 12

PRIOR ART

US 7,771,124 B2

BEARING APPARATUS FOR A WHEEL OF VEHICLE

CROSS-REFERENCE TO RELATED APPLICATIONS

This application claims priority to Japanese Patent Application No. 2003-157558, filed Jun. 3, 2003 and No. 2004-072222, filed on Mar. 15, 2004, which applications are herein expressly incorporated by reference.

FIELD OF THE DISCLOSURE

The present disclosure relates to a bearing apparatus for a vehicle wheel which rotatably supports the vehicle wheel, such as an automobile, and more particularly to a vehicle wheel bearing apparatus with a preload varying mechanism built into the bearing apparatus to variably set an optimum preload suitable to the running condition of the vehicle.

BACKGROUND OF THE DISCLOSURE

Figure 12:
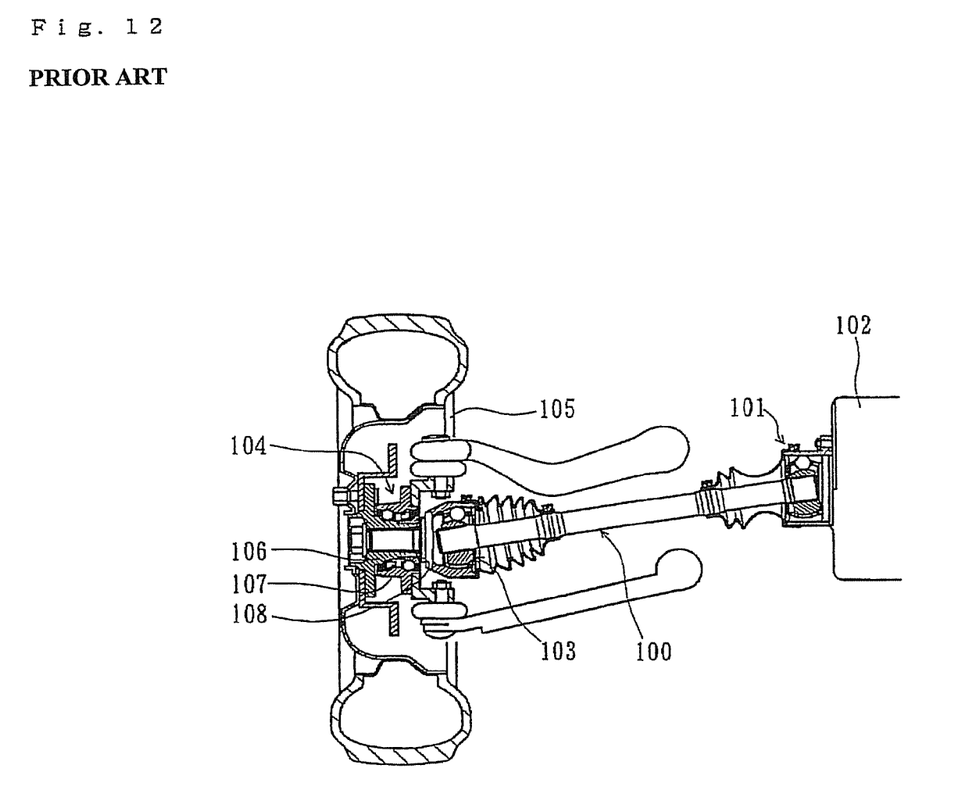
FIG. 12 is a longitudinal section view of an example of a power transmitting apparatus where a vehicle wheel bearing apparatus is incorporated.

A power transmitting apparatus which transmits engine power to the wheels is required not only to enable power transmission from the engine to the wheels, but to enable radial and axial displacement from the wheels as well as momentum displacement caused by bounding of the vehicle body during running on a rough road and cornering of the vehicle. Accordingly, as shown in FIG. 12, one end of the driving shaft 100 arranged between the engine and the driving wheel is connected to a differential apparatus 102 via a sliding type constant velocity universal joint 101. The other end of the shaft 100 is connected to a wheel 105 via a wheel bearing apparatus 104 which includes a stationary type constant velocity universal joint 103.

Figure 11:
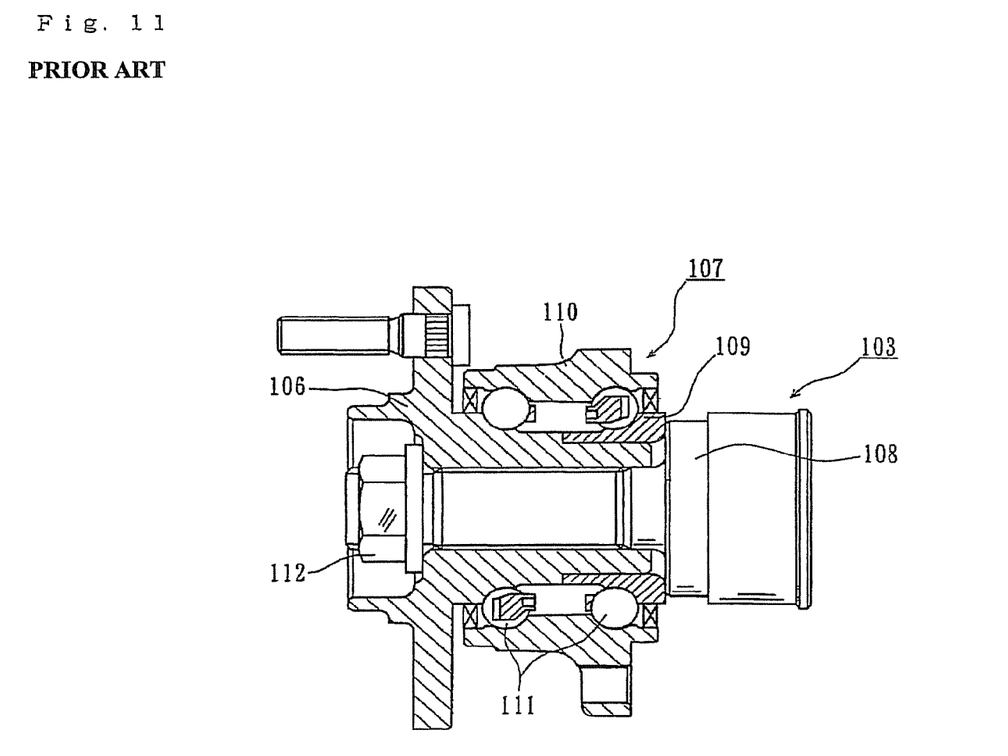
FIG. 11 is a longitudinal section view of the wheel bearing apparatus of the prior art.

As shown in FIG. 11, this vehicle wheel bearing apparatus 104 has a wheel hub 16 on which the wheel 105 is mounted at one end. A double row rolling bearing 107 rotatably supports the wheel hub 106. An outer joint member 108, of the stationary type constant velocity universal joint 103, transmits the power of the driving shaft 100 to the wheel hub 106. The double row rolling bearing 107 has an outer member 110, a separate inner ring 109, press fit on the outer periphery of the wheel hub 106, and double row rolling elements 111 rollably contained between the wheel hub 106, the inner ring 109 and the outer member 110.

Figure 9:
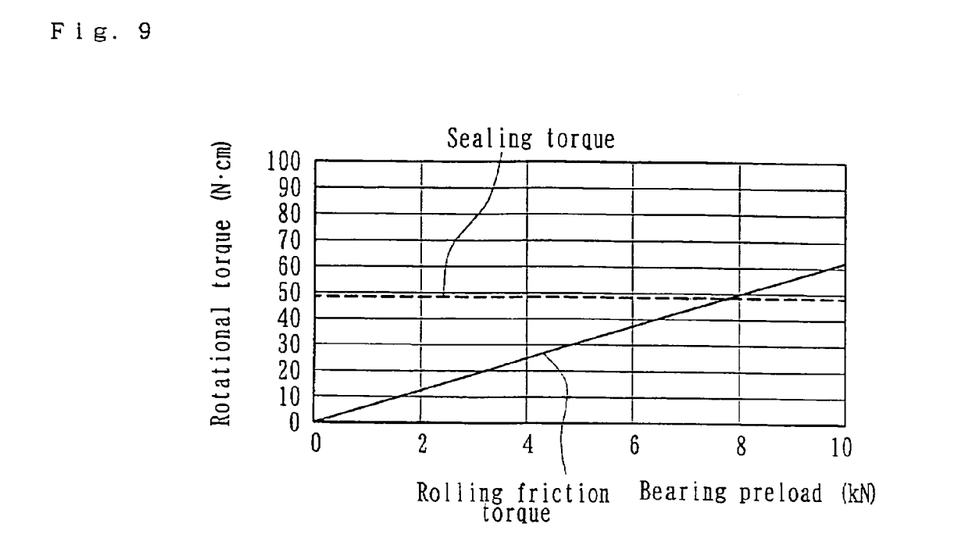
FIG. 9 is a graph of a relation between the bearing preload and the rotational torque.
Figure 10:
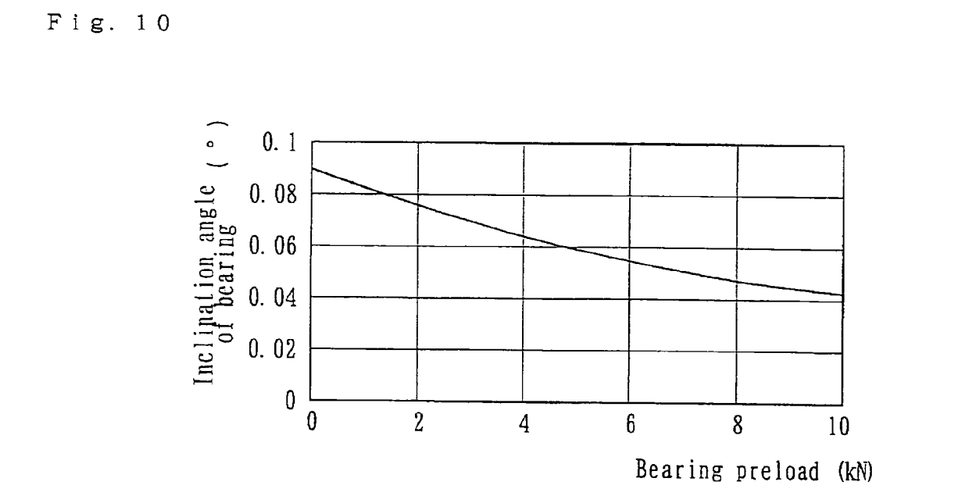
FIG. 10 is a graph of a relation between the bearing preload and the inclination angle of the bearing.

In such a vehicle wheel bearing apparatus 104, a predetermined preload is applied to the bearing apparatus in order to assure a desired bearing rigidity. Control of the bearing preload has been carried out by precisely finishing the abutting surfaces between the wheel hub 106 and the inner ring 109 as well as by tightly connecting the wheel hub 106 and the outer joint member 108 by fastening a securing nut 112 with a predetermined torque (axial force). Not only does the bearing preload influence the bearing life, it also influences other characteristics such as fuel consumption, etc. As shown in FIG. 9, since the rotational torque is proportional to the bearing preload, it is possible to contribute to improved fuel consumption by reducing the preload to reduce the rotational torque. On the contrary, since the inclination angle of bearing is an essential factor to determine the rigidity of bearing, which is inversely proportional to the bearing preload, as shown in FIG. 10, the bearing rigidity can improve by increasing the preload to reduce the inclination angle of bearing. Thus the inclination of the brake rotor (not shown) caused during cornering of the vehicle can also be suppressed.

If it is possible to control the optimum bearing preload in accordance with the running conditions of the vehicle, it is possible to provide a vehicle wheel bearing apparatus with ideal drive and fuel consumption characteristics. However no such bearing apparatus has yet been developed which can be variably set to the optimum bearing preload in accordance with the running conditions of the vehicle.

Figure 8:
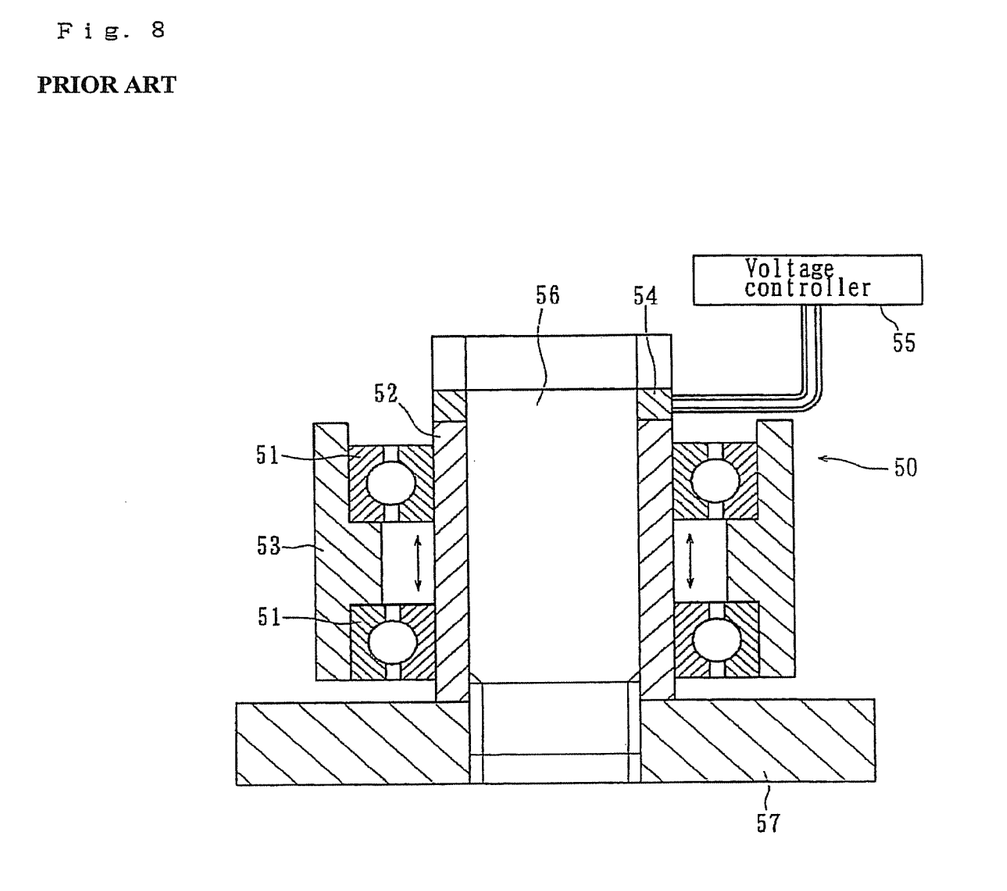
FIG. 8 is a longitudinal section view of a preload varying bearing unit of the prior art.

FIG. 8 shows a bearing unit 50 which can vary the bearing preload. This bearing unit has two rolling bearings 51 and 51, inner and outer cylindrical portions 52 and 53 to hold the rolling bearings 51 and 51, an electrostrictive element 54 arranged on one end of one of the cylindrical portions 52 and 53, and a voltage controller 55 to control voltage applied to the electrostrictive element 54. The cylindrical portion 52 together with the electrostrictive element 54 is secured to stationary portions 56 and 57 of the bearing unit 50. Preloading stabilization can be obtained by automatically setting the distance between the bearing inner rings at a predetermined value. A temperature sensor (not shown) detects temperature variation of the inner cylindrical portion 52 and the stationary portion 56. The distance is adjusted by extending or contracting the electrostrictive element 54 by using a voltage controller 55 to control the voltage applied to the electrostrictive element 54 in accordance with the temperature variation (cf. Japanese Laid-open Patent Publication No. 223216/1999).

SUMMARY OF THE DISCLOSURE

The above bearing unit 50 is directed to a unit which can only suppress the variation of the initially set preload of the two rolling bearings 51 and 51 which is caused by temperature variation using the electrostrictive element 54. Thus, this is different from a unit which intends to variably set the optimum preload in accordance with the running conditions of the vehicle. Accordingly, it is impossible to variably set the optimum preload in accordance with the running conditions of the vehicle by using the prior art bearing unit 50 which can only suppress the preload of the bearings 51 and 51 caused by temperature variation. This is because the load applied to the vehicle wheel bearing always randomly changes in accordance with the running conditions of the vehicle, e.g. whether it runs on straight or curved roads.

Accordingly, the present disclosure provides a vehicle wheel bearing apparatus which can variably set the optimum preload in accordance with the running conditions of the vehicle.

A vehicle wheel bearing apparatus comprises a wheel hub with an integrally formed peripheral wheel mounting flange at one end and a double row rolling bearing. The double row rolling bearing comprises an integrally formed outer member with a peripheral body mounting flange and double row outer raceway surfaces. An inner member includes the wheel hub and is formed with double row inner raceway surfaces, each of which is arranged opposite to each of the double row outer surfaces. Double row rolling elements are freely rotatably contained between the double row outer and inner raceway surfaces. The double row rolling bearing is adapted to receive a predetermined preload. A separate outer or inner ring is arranged on at least one of the outer or inner members. A preload varying mechanism is arranged at an abutting portion between the outer and inner members to vary the preload applied to the bearing. The preload varying mechanism can be extended or contracted based on an output signal from a detecting sensor which detects the running conditions of the vehicle.

Accordingly, due to a separate outer or inner ring arranged on at least one of the outer or inner members, a preload varying mechanism arranged at an abutting portion between the outer and inner members to vary the preload applied to the bearing, the preload varying mechanism extending or contracting based on an output signal from a detecting sensor to detect the running conditions of the vehicle, it is possible to suppress the inclination of the brake rotor by increasing the bearing preload when bearing rigidity is required during cornering of the vehicle. Thus, this ensures proper operation without any irregular motion. On the contrary, when the vehicle is running on a straight road, it is possible to reduce the rotational torque and the bearing friction loss by reducing the bearing preload. Thus, this improves fuel consumption.

The preload varying mechanism may be any one of an electrostrictive element, a magnetostrictive element, a shape memory element, or a member having a coefficient of thermal expansion higher than that of the structural parts of the bearing.

At least one of a load sensor, a vehicle speed sensor and a temperature sensor may be incorporated into the preload varying mechanism. This makes it possible to obtain an optimum bearing preload by applying a predetermined voltage to the preload varying mechanism by timely computing the preload based on real time information to determine whether the vehicle is on a straight or cornering run.

In another embodiment, a vehicle wheel bearing apparatus comprises a wheel hub integrally formed with a peripheral wheel mounting flange at one end and a double row rolling bearing. The double row rolling bearing comprises an outer member integrally formed with a peripheral body mounting flange and double row outer raceway surfaces. The wheel hub is formed with one of the inner raceway surfaces of the double row rolling bearing on its outer periphery. Also, a cylindrical portion axially extends from the inner raceway surface. An inner member, including a separate inner ring, is press fit onto the axially extending portion. Double row rolling elements are freely rotatably contained between the double row outer and inner raceway surfaces. The double row rolling bearing is adapted to receive a predetermined preload. The outer member comprises an outer ring member with one of the outer raceway surfaces formed on its inner periphery. A separate outer ring includes the other of the outer raceway surfaces formed on its inner periphery. An electrostrictive element is arranged at an abutting portion between the outer ring member and the outer ring. The electrostrictive element can be extended or contracted by applying a predetermined voltage to the electrostrictive element based on an output signal from a sensor.

According to this embodiment, since the electrostrictive element, arranged at an abutting portion between the outer ring member and the outer ring, can be extended or contracted by applying a predetermined voltage to the electrostrictive element based on an output signal from sensors, such as a steering angle sensor, a vehicle speed sensor etc, it is possible to suppress the inclination of the brake rotor by increasing the bearing preload when bearing rigidity is required during cornering of the vehicle. This ensures proper operation without any irregular motion. On the contrary, when the vehicle is running on a straight road, it is possible to reduce the rotational torque and the bearing friction loss by reducing the bearing preload. Thus, this improves fuel consumption.

If the electrostrictive element is a laminated piezo element, the assembly of the bearing apparatus can be simplified. Also, control of the preload can be achieved by a relatively exact and easy manner.

In another embodiment, a vehicle wheel bearing apparatus comprises a wheel hub, integrally formed with a peripheral wheel mounting flange at one end, and a double row rolling bearing. The double row rolling bearing comprises an outer member integrally formed with a peripheral body mounting flange and double row outer raceway surfaces. The wheel hub is formed with one of the inner raceway surfaces of the double row rolling bearing on its outer periphery. Also, a cylindrical portion axially extends from the inner raceway surface. An inner member, including a separate inner ring, is press fitted onto the axially extending portion. Double row rolling elements are freely rotatably contained between the double row outer and inner raceway surfaces. The double row rolling bearing is adapted to receive a predetermined preload. One end of the wheel hub has a securing portion. A magnetostrictive element is arranged between the securing portion and the inner ring. An electromagnetic coil is arranged at the end of the outer member opposite to the magnetostrictive element. The magnetostrictive element can be extended or contracted by applying a magnetic field from the electromagnetic coil based on an output signal from a load sensor arranged between the outer and inner members.

In such a structure, when a large load, such as a momentum load, is applied to the bearing during cornering of the vehicle, a predetermined magnetic field is applied to the magnetostrictive element in accordance with the applied load. An optimum preload is set in accordance with an increase of the bearing preload due to the extension of the magnetostrictive element. Thus, it is possible to suppress the inclination of the brake rotor by increasing the bearing preload when bearing rigidity is required during cornering of the vehicle. Thus, this ensures proper operation without any irregular motion. On the contrary, when the load applied to the bearing is not fluctuating, as in the case when the vehicle is running on a straight road, it is possible to reduce the rotational torque of the bearing. Thus, fuel consumption is improved since no magnetic field is applied to the magnetostrictive element and thus the initial preload is maintained.

The load sensor may comprise a magnetostrictive portion to be detected (e.g. magnetostrictive detected portion) made of Fe—Al alloy and a detecting coil arranged opposite to the magnetostrictive detected portion. This structure enables an exact load detection to be achieved without being influenced by a lubricant oil such as grease.

A temperature sensor may be arranged within the double row rolling bearing. The application of voltage may be switched off to stop the preload varying function when the output signal from the temperature sensor exceeds a predetermined threshold level. This structure prevents trouble caused by abnormal temperature rise.

The initial preload may be set by an output signal from the electrostrictive element or the magnetostrictive element. This structure enables easier preload control during assembly of the bearing apparatus than the preload control of the prior art since the assembling work can be completed at a point where a predetermined preload is obtained with the assembling work being carried out while watching an output signal from the electrostrictive element, which forms the preload varying mechanism.

One embodiment is a vehicle wheel bearing apparatus comprising a wheel hub integrally formed with a peripheral wheel mounting flange at one end and a double row rolling bearing. The double row rolling bearing comprises an outer member integrally formed with a peripheral body mounting flange and double row outer raceway surfaces. An inner member includes the wheel hub and is formed with double row inner raceway surfaces. Each surface is arranged opposite to each of the double row outer surfaces. The double row rolling elements are freely rotatably contained between the double row outer and inner raceway surfaces. The double row rolling bearing is adapted to receive a predetermined preload. A separate outer or inner ring is arranged on at least one of the outer and inner members. A preload varying mechanism is arranged at an abutting portion between the outer and inner members to vary a preload applied to the bearing. The preload varying mechanism can be extended or contracted based on an output signal from a detecting sensor to detect the running conditions of the vehicle. This makes it possible to suppress the inclination of the brake rotor by increasing the bearing preload when bearing rigidity is required during cornering of the vehicle. Thus, this ensures proper operation without any irregular motion. On the contrary, when the vehicle is running on a straight road, it is possible to reduce the rotational torque and the bearing friction loss by reducing the bearing preload. Thus, this improves the fuel consumption.

In another embodiment, a vehicle wheel bearing apparatus comprises a wheel hub, integrally formed with a peripheral wheel mounting flange at one end, and a double row rolling bearing. The double row rolling bearing comprises an outer member integrally formed with a peripheral body mounting flange and double row outer raceway surfaces. The wheel hub is formed with one of the inner raceway surfaces of the double row rolling bearing on its outer periphery. A cylindrical portion axially extends from the inner raceway surface. An inner member, including a separate inner ring, is press fit onto the axially extending portion. Double row rolling elements are freely rotatably contained between the double row outer and inner raceway surfaces. The double row rolling bearing is adapted to receive a predetermined preload. The outer member comprises an outer ring member formed with one of the outer raceway surfaces on its inner periphery. A separate outer ring is formed with the other of the outer raceway surfaces on its inner periphery. An electrostrictive element, arranged at an abutting portion between the outer ring member and the outer ring, can be extended or contracted by applying a predetermined voltage to the electrostrictive element based on an output signal from a sensor. This makes it possible to suppress the inclination of the brake rotor by increasing the bearing preload when bearing rigidity is required during cornering of the vehicle. Thus, this ensures proper operation without any irregular motion. On the contrary, when the vehicle is running on a straight road, it is possible to reduce the rotational torque and the bearing friction loss by reducing the bearing preload. Thus, this improves fuel consumption.

In another embodiment, a vehicle wheel bearing apparatus comprises a wheel hub, integrally formed with a peripheral wheel mounting flange at one end, and a double row rolling bearing. The double row rolling bearing comprises an outer member, integrally formed with a peripheral body mounting flange, and double row outer raceway surfaces. The wheel hub is formed with one of the inner raceway surfaces of the double row rolling bearing on its outer periphery and with a cylindrical portion axially extending from the inner raceway surface. An inner member, including a separate inner ring, is press fit onto the axially extending portion. Double row rolling elements are freely rotatably contained between the double row outer and inner raceway surfaces. The double row rolling bearing is adapted to receive a predetermined preload. One end of the wheel hub includes a securing portion. A magnetostrictive element is arranged between the securing portion and the inner ring. An electromagnetic coil is arranged at the end of the outer member opposite to the magnetostrictive element. The magnetostrictive element can be extended or contracted by applying a magnetic field from the electromagnetic coil based on an output signal from a load sensor arranged between the outer and inner members. In such a structure, when a large load, such as a momentum load, is applied to the bearing during cornering of the vehicle, a predetermined magnetic field is applied to the magnetostrictive element in accordance with the applied load. An optimum preload is set in accordance with an increase of the bearing preload due to the extension of the magnetostrictive element. Thus, it is possible to suppress the inclination of the brake rotor by increasing the bearing preload when bearing rigidity is required during cornering of the vehicle. Thus, this ensures proper operation without any irregular motion. On the contrary, when the load applied to the bearing is not fluctuating, as in the case where the vehicle is running on a straight road, it is possible to reduce the rotational torque of the bearing. Thus, this improves fuel consumption since no magnetic field is applied to the magnetostrictive element and thus the initial preload is maintained.

A vehicle wheel bearing apparatus comprises a wheel hub integrally formed with a peripheral wheel mounting flange at one end, and a double row rolling bearing. The double row rolling bearing comprises an outer member integrally formed with a peripheral body mounting flange and double row outer raceway surfaces. The wheel hub is formed with one of the inner raceway surfaces of the double row rolling bearing on its outer periphery and with a cylindrical portion axially extending from the inner raceway surface. An inner member, including a separate inner ring, is press fit onto the axially extending portion. Double row rolling elements are freely rotatably contained between the double row outer and inner raceway surfaces. The double row rolling bearing is adapted to receive a predetermined preload. The outer member comprises an outer ring member formed with one of the outer raceway surfaces on its inner periphery. A separate outer ring is formed with the other of the outer raceway surfaces on its inner periphery. An electrostrictive element, comprising a laminated piezo element arranged at an abutting portion between the outer ring member and the outer ring, can be extended or contracted by applying a predetermined voltage to the piezo element based on an output signal from a sensor.

BRIEF DESCRIPTION OF THE DRAWINGS

Additional advantages and features of the present invention will become apparent from the subsequent description and the appended claims, taken in conjunction with the accompanying drawings, wherein:

DESCRIPTION OF THE PRESENT DISCLOSURE

Figure 1:
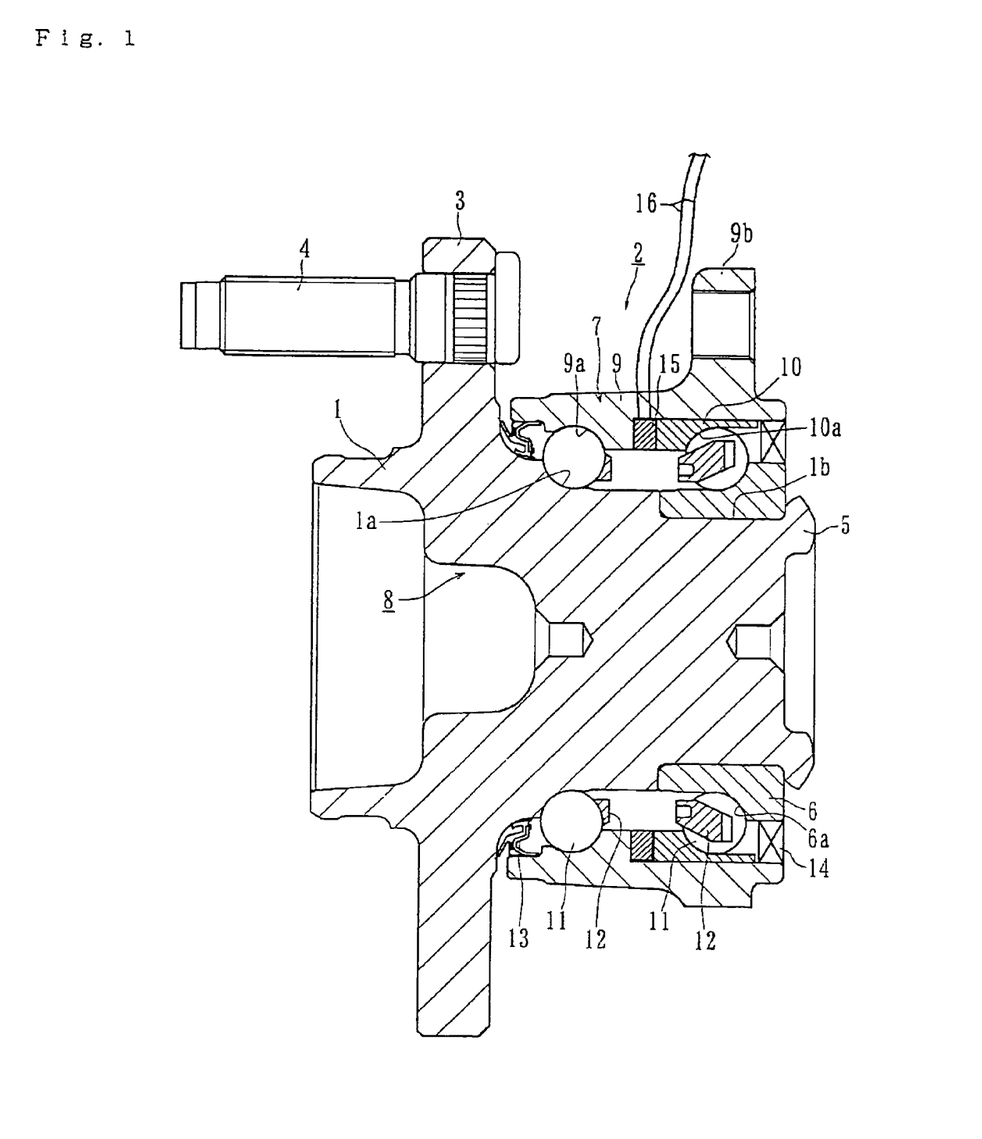
FIG. 1 is a longitudinal section view of a first embodiment of the wheel bearing apparatus of the present disclosure.

The present teachings will be described with reference to the accompanied drawings. FIG. 1 shows a first embodiment of a vehicle wheel bearing apparatus.

The vehicle wheel bearing apparatus is used for a driven wheel and includes a wheel hub 1 and a double row rolling bearing 2. In the description below, the term "outboard side" (left hand side in drawings) of the apparatus denotes a side which is positioned outside of the vehicle body. The term "inboard side" (right hand side in drawings) of the apparatus denotes a side which is positioned inside of the body when the bearing apparatus is mounted on the vehicle body.

The wheel hub 1 is integrally formed with a wheel mounting flange 3 at an end of the outboard side. An outboard side inner raceway surface 1a of a double row rolling bearing 2 is on the outer peripheral surface. A cylindrical portion 1b axially extends from the inner raceway surface 1a. Hub bolts 4, for securing the wheel on the flange 3, are equidistantly arranged along the periphery of the flange 3. The outer peripheral surface of the wheel hub 1 is formed with a hardened layer having a surface hardness of about 54~64 HRC in a region from the inner raceway surface 1a to the axially extending portion 1b. The heat treatment is preferably carried out by high frequency induction hardening suitable for a local heating and for easily setting a depth of the hardened layer. An end of the axially extending portion 1b remains as a non-hardened portion less than 25 HRC to form a caulked portion 5, which is plastically deformed radially outward.

A separate inner ring 6 is press fitted onto the axially extending portion 1b of the wheel hub 1. The inner ring is secured to the portion 1b by the caulked portion 5. An inner raceway surface 6a, of the inboard side, is formed on the outer peripheral surface of the inner ring 6. Inner raceway surface 6a, together with the inner raceway surface 1a, forms double row inner raceway surfaces 1a and 6a.

The double row rolling bearing 2 includes an outer member 7, an inner member 8 and double row rolling elements 11 and 11. The outer member 7 has an outer ring member 9 integrally formed with a body mounting flange 9b on its outer peripheral surface. The body mounting flange 9b mounts the bearing apparatus on the body (not shown) of the vehicle. An outer raceway surface 9a is formed on the inner peripheral surface of the outer ring member 9. A separate outer ring 10 is press fit onto the outer ring member 9 at its inboard side. An outer raceway surface 10a is formed on the inner peripheral surface of the outer ring member 9. The inner member 8 denotes the wheel hub 1 and the inner ring 6. The double row rolling elements 11 and 11 are contained between the double row outer raceway surfaces 9a and 10a and the double row inner raceway surfaces 1a and 6a. The rolling elements 11, 11 are rollably retained by cages 12 and 12. A hardened layer, having a surface hardness of about 54~64 HRC in a region from the outer raceway surface 9a to the inboard side end, is formed on the inner peripheral surface of the outer ring member 9. The heat treatment is preferably carried out by high frequency induction hardening suitable for a local heating and for easily setting a depth of the hardened layer. Seals 13 and 14 are arranged at the ends of the double row rolling bearing 2 to prevent leakage of grease contained within the bearing 2 as well as ingress of rain water or dusts. The illustrated ball rolling elements 11 and 11 may be replaced, for example, by conical rolling elements.

A ring shaped electrostrictive element 15 is arranged at an abutted region between the outer ring member 9 and outer ring 10. The ring shaped electrostrictive element 15 is formed by laminated piezo elements or the like to which a voltage control apparatus (not shown) is connected via a wire cable 16 to control the voltage applied to the electrostrictive element 15. In this embodiment, a predetermined voltage is applied to the electrostrictive element 15 during cornering of the vehicle in accordance with a steering angle and a vehicle speed based on output signals from a steering angle sensor and a vehicle speed sensor (not shown) in order to extend the electrostrictive element 15 to increase the bearing preload and to set an optimum preload. On the contrary, when the vehicle runs on a straight road, no voltage is applied to the electrostrictive element 15 and the initial preload is maintained. Accordingly, it is possible to suppress the inclination of the brake rotor (not shown) by increasing the bearing preload when bearing rigidity is required during cornering of the vehicle. Thus, this ensures proper operation without any irregular motion. On the contrary, when the vehicle is running on a straight road, it is possible to reduce the rotational torque and the bearing friction loss by reducing the bearing preload. Thus, this improves fuel consumption. According to this embodiment, since the bearing preload is set at a light preload so as to meet the running condition on a straight road, which is longer than during cornering, the life of bearing can be further improved.

Figure 2:
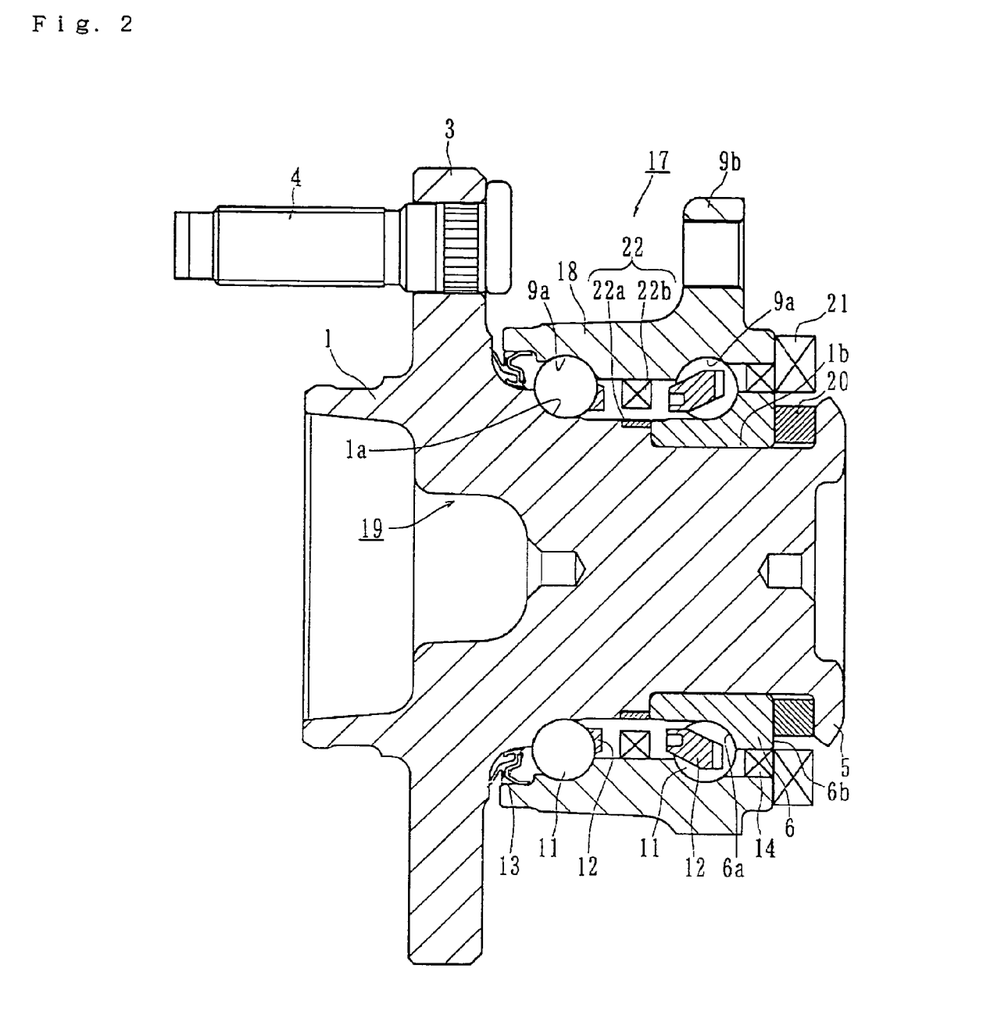
FIG. 2 is a longitudinal section view of a second embodiment of the wheel bearing apparatus of the present disclosure.

FIG. 2 is a longitudinal view of a second embodiment of the wheel bearing apparatus. Same reference numerals are used in this embodiment to designate same parts having the same functions used in the first embodiment.

This vehicle wheel bearing apparatus has the wheel hub 1 and a double row rolling bearing 17. The double row rolling bearing 17 includes an outer member 18, an inner member 19 and the double row rolling elements 11 and 11. The outer member 18 is integrally formed with a body mounting flange 9b on its outer peripheral surface. The flange 9b mounts the bearing apparatus on the body (not shown) of the vehicle. Double row outer raceway surfaces 9a and 9a are on the inner peripheral surface of the outer member 18.

A separate inner ring 6 is press fit onto the axially extending portion 1b of the wheel hub 1. The ring 6 is secured by the caulked portion 5. The double row rolling elements 11 and 11 are contained between the double row outer raceway surfaces 9a and 9a and the double row inner raceway surfaces 1a and 6a and are rollably retained by cages 12 and 12. A hardened layer, having a surface hardness of about 54~64 HRC in a region from the outer raceway surface 9a to the press fitted portion of seals 13 and 14 is formed on the inner peripheral surface of the outer member 18. The heat treatment is preferably carried out by high frequency induction hardening suitable for a local heating and for easily setting a depth of the hardened layer.

A ring shaped magnetostrictive element 20 is interposed between an end 6b of the inner ring 6 and the caulked portion 5. An electromagnetic coil 21 is mounted on the inboard side end face of the outer member 18 opposite of the magnetostrictive element 20. The magnetostrictive element 20 extends to increase the preload when the magnetic field is applied to the magnetostrictive element 20 by the electromagnetic coil 21. The inner member 19 denotes the wheel hub 1, the inner ring 6 and the magnetostrictive element 20.

According to the present embodiment, a load sensor 22 is arranged between the outer member 18 and the wheel hub 1. The load sensor 22 has a portion to be detected (e.g. detected portion) 22a made of magnetostrictive material such as Fe—Al alloy. The material is mounted on the wheel hub 1 and a detecting coil 22b is mounted on the outer member 18. The load sensor 22 can detect a variation of magnetostriction caused by an increase or decrease of the load applied to the apparatus as variation of magnetic resistance detected by the detecting coil 22b. Accordingly, when a large load, such as a momentum load is applied to the apparatus during a cornering run on a curved road, a predetermined magnetic field is applied to the magnetostrictive element 20 by the electromagnetic coil 21 in accordance with the load. Thus, the magnetostrictive element 20 is extended to increase the bearing preload and to set an optimum preload. On the contrary, when the vehicle runs on a straight road, no magnetic field is applied to the magnetostrictive element 20. Thus, the initial preload is maintained. Accordingly, it is possible to suppress the inclination of the brake rotor by increasing the bearing preload when bearing rigidity is required during a cornering run of the vehicle. Thus, this ensures proper operation without any irregular motion. On the contrary, when the vehicle is running on a straight road, it is possible to reduce the rotational torque and the bearing friction loss by reducing the bearing preload. Thus, this improves fuel consumption.

Figure 3:
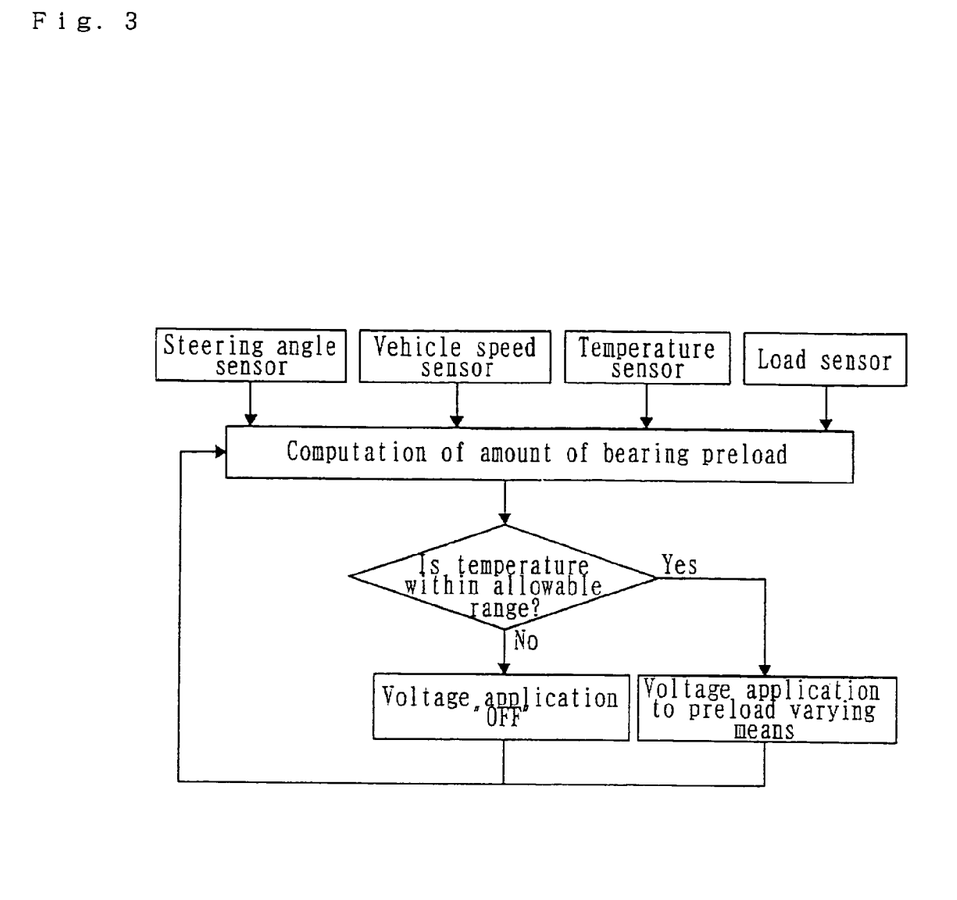
FIG. 3 is a flow chart of a method for controlling the preload of the wheel bearing apparatus of the present disclosure.

A method to control the preload will be described with reference to a flow chart shown in FIG. 3. As previously described, the bearing apparatus of the present teaching is provided with the preload varying mechanism including the electrostrictive element 15 or magnetostrictive element 20 and electromagnetic coil 21, the load sensor 22, the vehicle speed sensor, temperature sensor, or the like to detect the running conditions of the vehicle. To obtain various real time information as to the steering angle, the vehicle speed and the load acting on the bearing during vehicle travel, a predetermined voltage is applied to the preload varying mechanism to achieve a desired optimum preload, by momentarily computing the preload. During which, the voltage application is "OFF" when the output of the temperature sensor mounted within the bearing exceeds a threshold in order to stop the preload varying function.

Although the preload varying mechanism comprising the electrostrictive element 15 and that comprising the magnetostrictive element 20 and the electromagnetic coil 21 are illustrated as preferred embodiments, it is possible, for example, to use shape memory alloy. In this case, if setting two conditions of the shape memory at higher or lower points than the transformation point, two axial length conditions of the shape memory alloy can be obtained. Thus, it is possible to extend the shape memory alloy in the vehicle cornering travel condition and not to extend it in the vehicle straight travel condition. It is possible to use either a contact method or a non-contact method via electric power supply to an electromagnetic coil as a heating mechanism for the shape memory alloy. In addition, it is also possible to use aluminum alloy or plastics, with a high coefficient of thermal expansion, in place of shape memory alloy. Furthermore, the output signals of the steering angle sensor, the load sensor, etc may be transmitted outside via a wireless manner.

Figure 4:
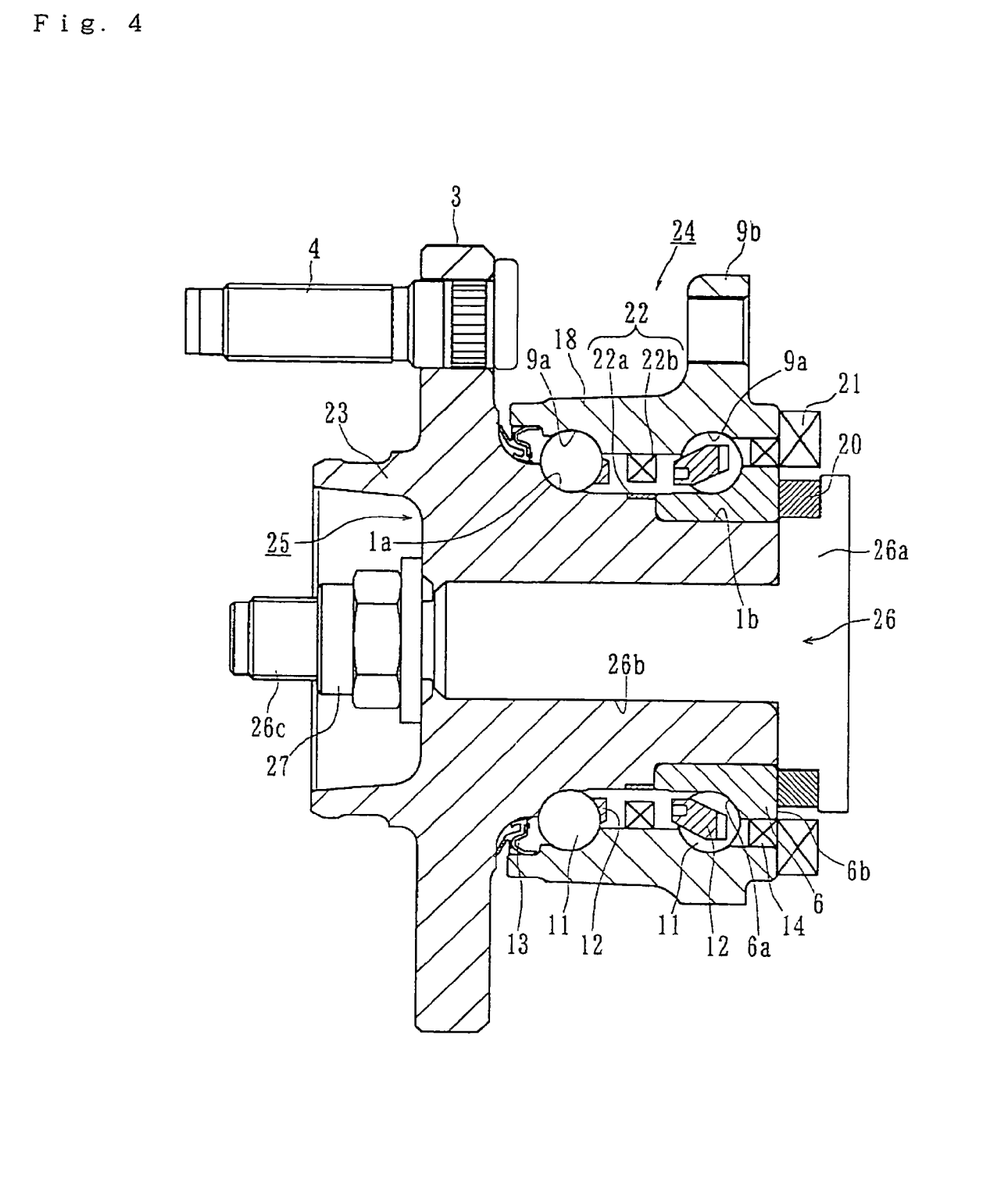
FIG. 4 is a longitudinal section view of a third embodiment of the wheel bearing apparatus of the present disclosure.

FIG. 4 is a longitudinal view of a third embodiment of the wheel bearing apparatus. The same reference numerals are used in this embodiment to designate the same parts having the same functions used in the second embodiment. This embodiment is different from the second embodiment only in its preload applying structure.

This vehicle wheel bearing apparatus comprises a wheel hub 23 and a double row rolling bearing 24. The double row rolling bearing 24 has an outer member 18, an inner member 25 and the double row rolling elements 11 and 11. The outer member 18 is integrally formed with a body mounting flange 9b on its outer peripheral surface. The flange 9b mounts the bearing apparatus on the vehicle body (not shown). Double row outer raceway surfaces 9a and 9a are on the inner peripheral surface of the outer member 18. A separate inner ring 6 is press fit onto the axially extending portion 1b of the wheel hub 23. The double row rolling elements 11 and 11 are contained between the double row outer raceway surfaces 9a and 9a and the double row inner raceway surfaces 1a and 6a and are rollably retained by cages 12 and 12.

The wheel hub 23 is formed to have a hollow structure and a securing member 26 is inserted into a central bore of the wheel hub 23. The securing member 26 has a flange portion 26a at one end and a shaft portion 26b with a male thread 26c. A ring shaped magnetostrictive element 20 is interposed between the end of the larger diameter of the inner ring 6 and the flange portion 26a. The inner ring 6 is axially immovably secured relative to the wheel hub 23 by fastening a nut 27 on the male thread 26c at a predetermined fastening torque. On the contrary, an electromagnetic coil 21 is mounted on the inboard side end face of the outer member 18 opposite to the magnetostrictive element 20. The magnetostrictive element 20 extends to increase the preload when the magnetic field is applied to the magnetostrictive element 20 by the electromagnetic coil 21. Thus, the inner member 25 denotes the wheel hub 23, the securing member 26, the nut 27, the inner ring 6 and the magnetostrictive element 20.

Figure 5:
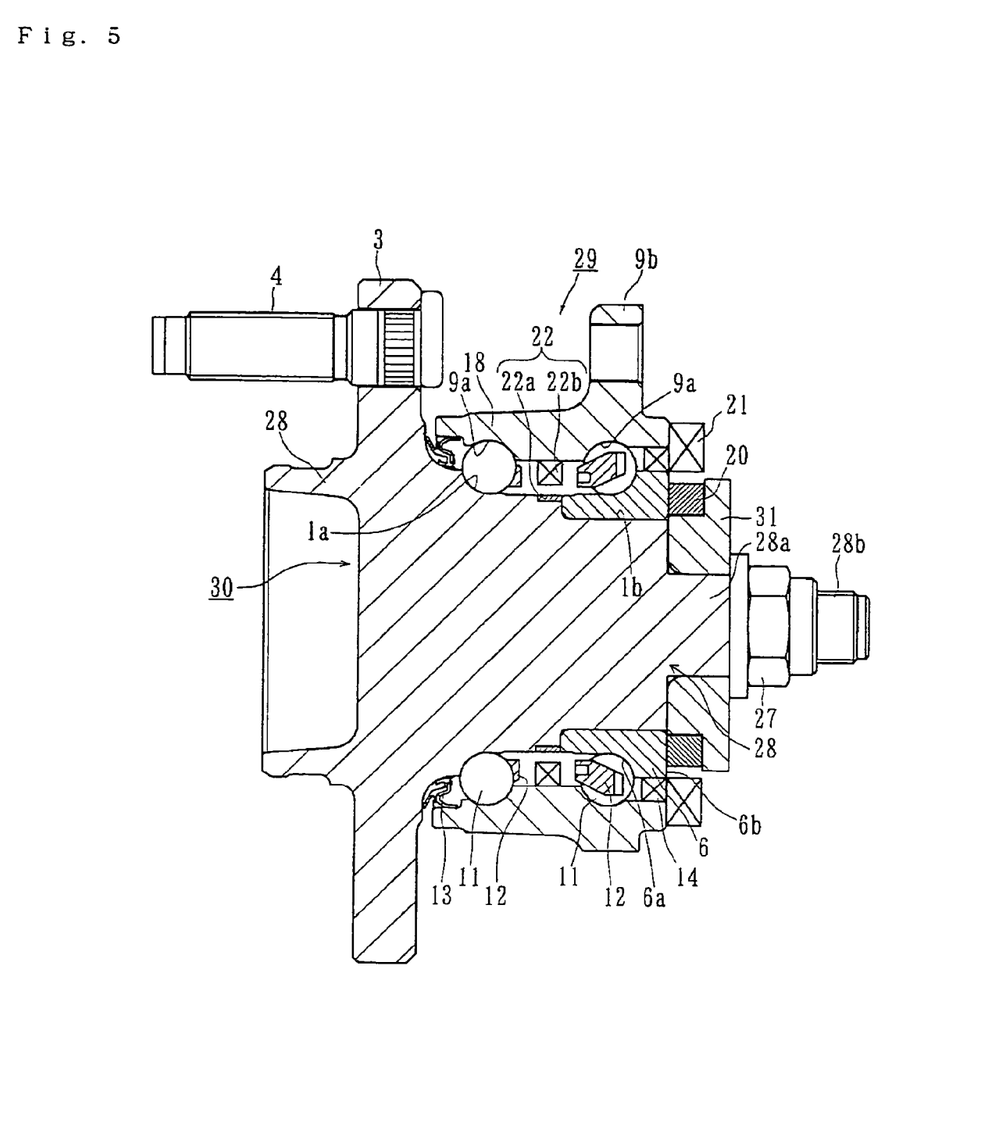
FIG. 5 is a longitudinal section view of a fourth embodiment of the wheel bearing apparatus of the present disclosure.

FIG. 5 is a longitudinal view of a fourth embodiment of the wheel bearing apparatus. This embodiment is a modification of the third embodiment. Thus, the same reference numerals are used in this embodiment to designate the same parts having the same functions used in the third embodiment.

This vehicle wheel bearing apparatus comprises a wheel hub 28 and a double row rolling bearing 29. This double row rolling bearing 29 has the outer member 18, an inner member 30 and the double row rolling elements 11 and 11. The wheel hub 28 has the axially extending portion extending from the inner raceway surface 1a and a shaft portion 28a with a male thread 28b. The separate inner ring 6 is press fit onto the axially extending portion 1b of the wheel hub 28 and immovably secured relative to the wheel hub 28 by the fastening nut 27, via a ring shaped securing member 31.

A ring shaped magnetostrictive element 20 is interposed between the end 6b of the larger diameter of the inner ring 6 and the securing member 31. On the contrary, the electromagnetic coil 21 is mounted on the inboard side end face of the outer member 18 opposite to the magnetostrictive element 20. The magnetostrictive element 20 extends to increase the preload when the magnetic field is applied to the magnetostrictive element 20 by the electromagnetic coil 21. Thus, the inner member 30 denotes the wheel hub 28, the securing member 31, the nut 27, the inner ring 6 and the magnetostrictive element 20.

Figure 6:
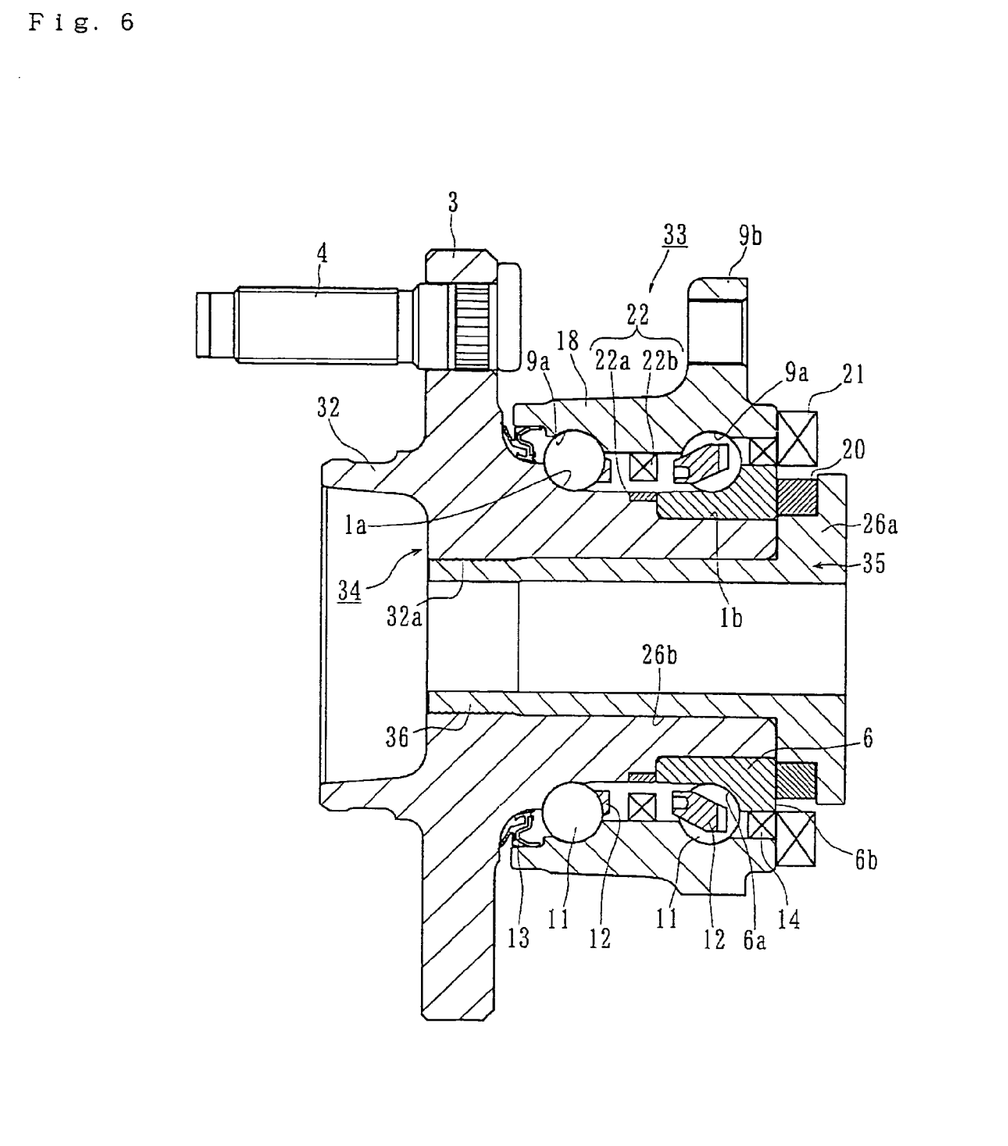
FIG. 6 is a longitudinal section view of a fifth embodiment of the wheel bearing apparatus of the present disclosure.

FIG. 6 is a longitudinal view of a fifth embodiment of the wheel bearing apparatus. The same reference numerals are used in this embodiment to designate the same parts having the same functions used in the third embodiment (FIG. 4). This embodiment is modification of the third embodiment and differs from the third embodiment only in a manner of securing the securing member.

This vehicle wheel bearing apparatus comprises a wheel hub 32 and a double row rolling bearing 33. This double row rolling bearing 33 has the outer member 18, an inner member 34 and the double row rolling elements 11 and 11. The wheel hub 32 is formed with a hollow structure and a securing member 35 inserted into a central bore of the wheel hub 32. The securing member 35 has a hollow structure and is formed with the flange portion 26a, the shaft portion 26b, and a fitting portion 36 at an end of the shaft portion 26b. A ring shaped magnetostrictive element 20 is interposed between the end 6*b* of the larger diameter of the inner ring 6 and the flange portion 26*a*.

An irregular portion 32*a* is formed on the inner peripheral surface of the wheel hub 32. Also, a hardened layer, having a surface hardness of about 54~64 HRC, is formed on the wheel hub 32. The heat treatment is preferably carried out by high frequency induction hardening suitable for a local heating and for easily setting a depth of the hardened layer. The irregular portion 32*a* may be formed to have a knurled crisscross pattern.

The wheel hub 32 and the securing member 35 are integrally united by expanding and plastically deforming the fitting portion 36 using a suitable means such as a mandrel. Thus, the irregular portion 32*a* of the wheel hub 32 bites into material of the fitting portion 36 of the securing member 35. The inner ring 6 is axially immovably secured relative to the wheel hub 32. The fitting portion 36 is remained as a non-hardened portion less than 24 HRC. It is preferable to set the difference of surface hardness between the fitting portion 36 and the irregular portion 32*a* at more than 30 HRC. This enables the irregular portion 32*a* to easily and deeply bite into the fitting portion 36 and also to plastically unite them without causing deformation of the tips of the irregular portion 32*a*. The inner member 34 denotes the wheel hub 32, the securing member 35, the inner ring 6 and the magnetostrictive element 20.

The preload controlling method during assembly of the vehicle wheel bearing apparatus will be described with reference to the embodiment of FIG. 1.

Figure 7:
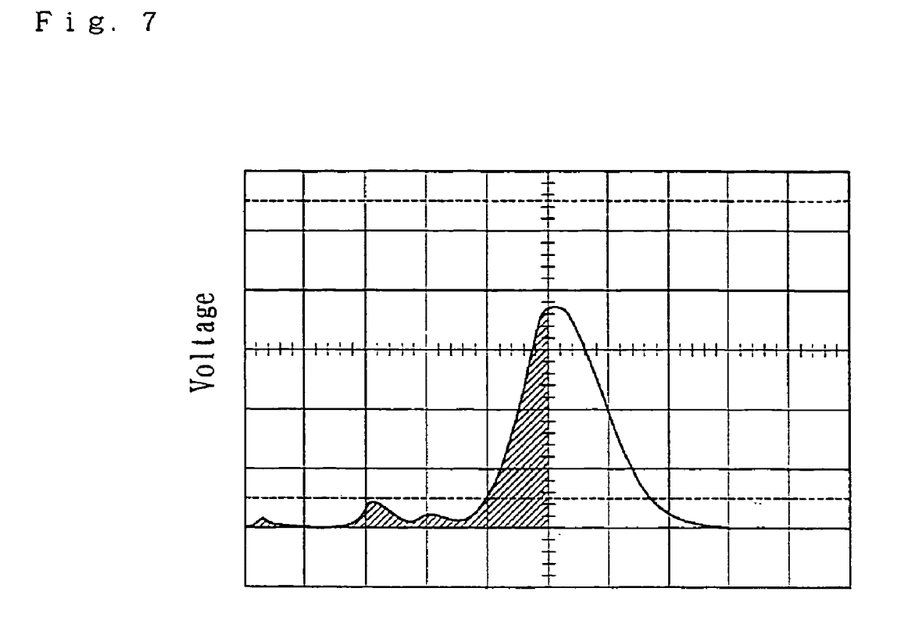
FIG. 7 is a graph of a wave of an output signal from the electrostrictive element of the present disclosure.

In assembly of the bearing apparatus, an output signal from the electrostrictive element 15, during fixation of the inner ring 6 relative to the wheel hub by the caulked portion 5, has a wave configuration shown in FIG. 7. In this wave configuration, a left hand portion with respect to the peak value (a hatched portion in FIG. 7) shows a plus portion in the preload variation and a right hand portion shows a discharge of electric charge in the electrostrictive element 15. Since an integral value of the left hand portion corresponds to the preload, it is possible to exactly set the suitable initial preload by controlling its integral amount. Thus, since the assembly of the bearing apparatus can be carried out while watching the output signal from the electrostrictive element 15 which forms the preload varying mechanism, it is possible to complete the assembling work at a time where the predetermined preload is obtained. Also, it is possible to more exactly and easily control the preload than in the conventional torque control manner.

Similar preload control can be carried out in the case of using the magnetostrictive element 20 in the second embodiment (FIG. 2). In this magnetostrictive element 20, it is possible to easily detect the variation of the preload as a variation of the magnetic permeability, i.e. as a voltage variation exhibiting a linear relation in the magnetic coil 21. Accordingly, since the assembling work can be carried out, similar to the case of the electrostrictive element 15, while watching the output signal from the magnetostrictive element 20, the preload control can be exactly and easily carried out.

The vehicle wheel bearing apparatus can be applied to any kind of structure where a predetermined preload is adapted to be applied to a double row rolling bearing.

The present disclosure has been described with reference to the preferred embodiments. Obviously, modifications and alternations will occur to those of ordinary skill in the art upon reading and understanding the preceding detailed description. It is intended that the present teaching be construed as including all such alternations and modifications insofar as they come within the scope of the appended claims or the equivalents thereof.

What is claimed is:

1. A vehicle wheel bearing apparatus comprising:
a wheel hub integrally formed with a peripheral wheel mounting flange at one end;
a double row rolling bearing, the double row rolling bearing comprising an outer member integrally formed with a peripheral body mounting flange and with double row outer raceway surfaces, said wheel hub formed with one of the inner raceway surfaces of the double row rolling bearing on its outer periphery and with a cylindrical portion axially extending from the one inner raceway surface;
an inner member including a separate inner ring press fit onto the axially extending portion, double row rolling elements being freely rotatably contained between said double row outer and inner raceway surfaces, said double row rolling bearing being adapted to receive a predetermined preload;
said outer member comprises an outer ring member formed with one of the outer raceway surfaces on its inner periphery and a separate outer ring formed with the other of the outer raceway surfaces on its inner periphery; and
an electrostrictive element, arranged at an abutting portion between said outer ring member and the outer ring, being extended or contracted by applying a predetermined voltage to the electrostrictive element based on an output signal from a steering angle sensor in order to extend the electrostrictive element.

2. The vehicle wheel bearing apparatus of claim 1 wherein the electrostrictive element comprises a laminated piezo element.

3. A vehicle wheel bearing apparatus comprising:
a wheel hub integrally formed with a peripheral wheel mounting flange at one end;
a double row rolling bearing, the double row rolling bearing comprising an outer member integrally formed with a peripheral body mounting flange and with double row outer raceway surfaces, said wheel hub formed with one of the inner raceway surfaces of the double row rolling bearing on its outer periphery and with a cylindrical portion axially extending from the inner raceway surface;
an inner member including a separate inner ring press fit onto the axially extending portion;
double row rolling elements freely rotatably contained between said double row outer and inner raceway surfaces, said double row rolling bearing being adapted to receive a predetermined preload;
one end of the wheel hub including a securing portion;
a magnetostrictive element is arranged between the securing portion and the inner ring; and
an electromagnetic coil is arranged at the end of the outer member opposite to the magnetostrictive element, the magnetostrictive element can be extended or contracted by applying a magnetic field from the electromagnetic coil based on an output signal from a load sensor arranged between the outer and inner members.

4. The vehicle wheel bearing apparatus of claim 3, wherein the load sensor comprises a magnetostrictive detected portion made of Fe—Al alloy and a detecting coil arranged opposite to the magnetostrictive detected portion.

5. The vehicle wheel bearing apparatus of claim 3, wherein a temperature sensor is arranged within the double row rolling bearing, and the application of voltage is switched off to stop the preload varying function when the output signal from the temperature sensor exceeds a predetermined threshold level.

6. The vehicle wheel bearing apparatus of claim 3, wherein the initial preload is set by an output signal from an electrostrictive element.

7. The vehicle wheel bearing apparatus of claim 3, wherein the initial preload is set by an output signal from the magnetostrictive element.

* * * * *